United States Patent Office 3,389,151
Patented June 18, 1968

3,389,151
PREPARATION OF QUINIZARIN-
2-SULFONIC ACID
Dominic A. Zanella, Lock Haven, Pa., assignor to American Aniline Products, Inc., a corporation of Delaware
No Drawing. Filed Mar. 7, 1966, Ser. No. 532,110
6 Claims. (Cl. 260—375)

ABSTRACT OF THE DISCLOSURE

Quinizarin-2-sulfonic acid, a valuable dyestuff intermediate, is made by admixing quinizarin with oleum having a concentration of 10–15 percent by weight $SO_3$ in the presence of an anhydrous water-soluble alkali or alkaline earth metal sulfate. The mixture is allowed to react at 100–135° C. and quinizarin-2-sulfonic acid is recovered therefrom by conventional methods.

---

This invention relates to the preparation of 1,4-dihydroxy-anthraquinone-2-sulfonic acid, commonly known as quinizarin-2-sulfonic acid. In one specific aspect, it relates to a surprising improvement in the sulfonation of quinizarin with oleum.

Quinizarin-2-sulfonic acid has been recognized as a commercially valuable dyestuff intermediate for many years. Early attempts to make this compound from quinizarin by sulfonation with concentrated oleum at high temperatures were relatively unsuccessful, particularly because of the formation of substantial amounts of 6-isomer. A process was soon developed for making quinizarin-2-sulfonic acid in an aqueous medium by reacting quinizarin with a sulfite, preferably in the presence of manganese dioxide. Over the years the sulfite process continued to be the basic method for the sulfonation of quinizarin to make quinizarin-2-sulfonic acid. As late as 1951, Bamberger et al. in U.S. Patent 2,575,155 disclosed an improved process involving the reaction of 1,4-dihydroxy-anthraquinone with sodium sulfite in the presence of an organic nitro compound.

I have now discovered a commercially practical process based on the sulfonation of quinizarin with oleum, which provides surprisingly high yields of relatively pure quinizarin-2-sulfonic acid. My new process gives quinizarin-2-sulfonic acid of good purity in yields of 90–95% and eliminates the problems attendant the prior attempts using oleum; i.e., the hydroxylation of quinizarin and the lack of selectivity in the sulfonation reaction.

It is, therefore, an object of the present invention to provide a commercially useful process for making quinizarin-2-sulfonic acid of high purity in excellent yields.

In conducting the reaction sufficient oleum must be present according to theory to obtain monosulfonation. As a practical matter the oleum should be present in substantial excess to serve as the reaction medium. Conveniently, three to seven parts by weight oleum are present for each part quinizarin charged to the reaction mixture. The use of oleum in excess of this amount is not detrimental to the reaction but is obviously wasteful.

The concentration of oleum used in the reaction is relatively critical and ranges between 10 and 15 percent by weight $SO_3$, with best results being obtained at 12.5 percent by weight $SO_3$. If the higher concentrations of oleum used by prior workers are used, i.e., 20 percent, the yield of the desired product is drastically diminished. Oleum of less than 10 percent concentration is considerably less effective in effecting sulfonation.

It is necessary that the reaction is conducted in the presence of an anhydrous water soluble alkaline metal sulfate, the use of which prevents the hydroxylation of the quinizarin and the formation of sulfones, and provides the desired selectivity of sulfonation. Useful alkaline metal sulfates include the alkali metal sulfates, such as sodium sulfate and potassium sulfate, and water soluble alkaline earth metal sulfates, such as magnesium sulfate. Of the foregoing, sodium sulfate is preferred. The amount of alkaline metal sulfate present should be substantial, but the exact amount is not critical. Preferably the sulfate is present in an amount ranging between 25 and 75 percent by weight, based on the weight of quinizarin charged to the reaction mixture.

The reaction is conducted at a temperature of 100–135° C., preferably at 125–130° C. At temperatures below 100° C. the sulfonation reaction is sluggish and temperatures above 135° C. have a marked deleterious effect on yield.

The reaction is generally complete in 16 to 24 hours. After completion of the reaction, the product quinizarin-2-sulfonic acid is recovered by conventional methods. Conveniently, the reaction mass is cooled to 30–50° C. and drowned in water. The product is insoluble in cold water and can be recovered by filtration or centrifugation.

Purification can be accomplished by adding activated charcoal to the drowned mass and heating for a period of time at 70–100° C. After removal of the charcoal by filtration the desired product is precipitated by cooling the filtrate to a temperature of approximately 25–30° C. Further purification can be effected if desired by re-slurrying the cake thus obtained, followed by neutralization to slight acidity to Congo red with caustic. The neutralized mixture can be heated to almost complete solution and thereafter cooled to about 20–30° C. There is thus obtained bright orange crystals of quinizarin-2-sulfonic acid in yields of approximately 90–95 percent of theory.

My invention is further illustrated by the following examples.

Example I

To a one-liter 3-neck flask, provided with a calcium chloride drying tube, there was charged 400 g. 12.5 percent oleum, prepared from 254 g. 25 percent oleum and 146 g. 98 percent sulfuric acid. To the oleum, at temperature below 90° C., there was added 50 g. sodium sulfate. The mixture was stirred to solution at 90° C. and there was then added 100 g. crude quinizarin (85% purity). The mixture was heated to 125° C. during two hours and was held at 125–130° C. for twenty hours. The mixture was then cooled, with stirring, to 50° C. and poured into 3,000 ml. water.

The drowned mass was heated to 60° C. and 10 g. activated charcoal and 10 g. filter aid were added thereto. The temperature was then raised to 95° C. and maintained for ½-hour. The charcoal and filter aid, along with impurities, were removed by filtration and the crude cake was washed with 200 ml. of water at 95° C. The combined filtrate and wash was stirred and cooled to 30° C. to precipitate the quinizarin-2-sulfonic acid, which was removed by filtration. The cake thus obtained was re-slurried with 1,000 ml. of water and neutralized to slight acidity to Congo red with 80 g. 50 percent sodium hydroxide. A 2,000 ml. quantity of water was added. The mixture was heated to almost complete solution at 95° C. It was then stirred and cooled to 20° C., filtered and washed with 300 ml. of ice water in three 100 ml. portions. There was thus obtained 113.5 g. of substantially pure quinizarin-2-sulfonic acid, representing a yield of 95 percent of theory.

Example II

The procedure of Example I was repeated with the exception that 20 percent oleum, prepared from 341 g. 25 percent oleum and 59 g. 98 percent sulfonic acid, was used. After the addition of the quinizarin the reaction mixture was heated to 140° C. during two hours and held at a temperature of 140–145° C. for twenty hours.

The recovery and purification procedures were the same as those described in Example I. There was thus obtained 38.5 g. of quinizarin-2-sulfonic acid, representing a yield of 32 percent of theory.

This example illustrates the critical importance of both oleum concentration and reaction temperature. If the oleum is too concentrated and the reaction temperature is too high, the yield of product is reduced to such an extent that the process is no longer commercially useful.

Example III

The procedure of Example II was repeated in the absence of anhydrous sodium sulfate. No quinizarin-2-sulfonic acid was obtained as a product, illustrating the critical importance of the presence of the alkaline metal salt.

I claim:

1. Method of making quinizarin-2-sulfonic acid comprising admixing quinizarin with oleum having a concentration of 10–15 percent $SO_3$ in the presence of an anhydrous water soluble alkaline metal sulfate, allowing the mixture to react at a temperature of 100–135° C., and recovering quinizarin-2-sulfonic acid from the reaction mixture.

2. Method according to claim 1 wherein the alkaline metal sulfate is an alkali metal sulfate.

3. Method according to claim 2 wherein the alkali metal sulfate is present in an amount ranging between 25–75 percent by weight, based upon the weight of quinizarin.

4. Method according to claim 3 wherein the alkali metal sulfate is sodium sulfate.

5. Method according to claim 2 wherein the reaction temperature is maintained at 125–130° C.

6. Method according to claim 5 wherein the oleum concentration is 12.5 percent.

References Cited

UNITED STATES PATENTS 621,679   3/1899   Isler _____ 260—375

OTHER REFERENCES

G. von Georgievics: Chem. Zentr., 1905(I), pp. 1515–1516 (1905).

P. G. Marshall: J. Chem. Soc., 1931, pp. 3206–3208 (p. 3206 relied upon) (1931).

LORRAINE A. WEINBERGER, *Primary Examiner.*

H. C. WEGNER, *Assistant Examiner.*